Figure 1:
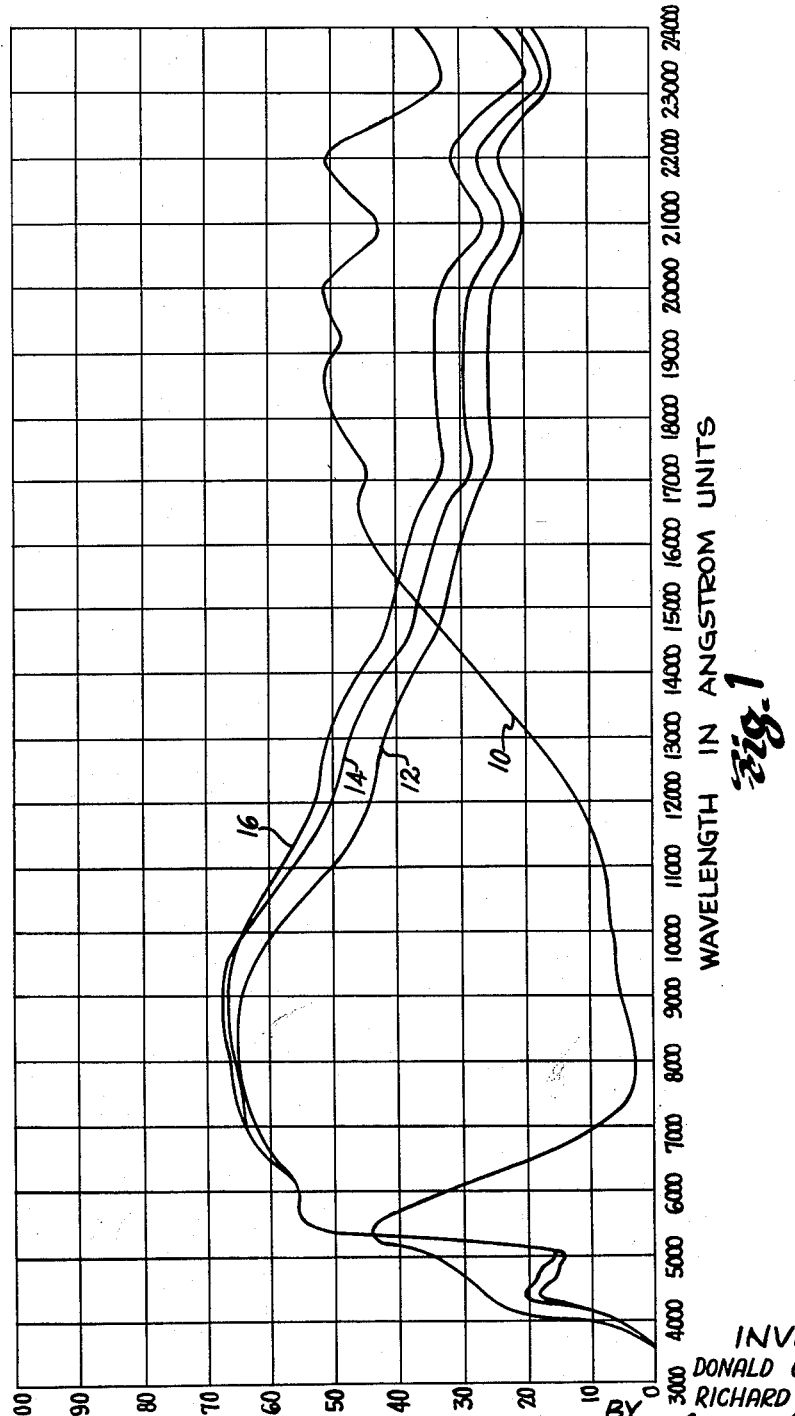
Figure 2:
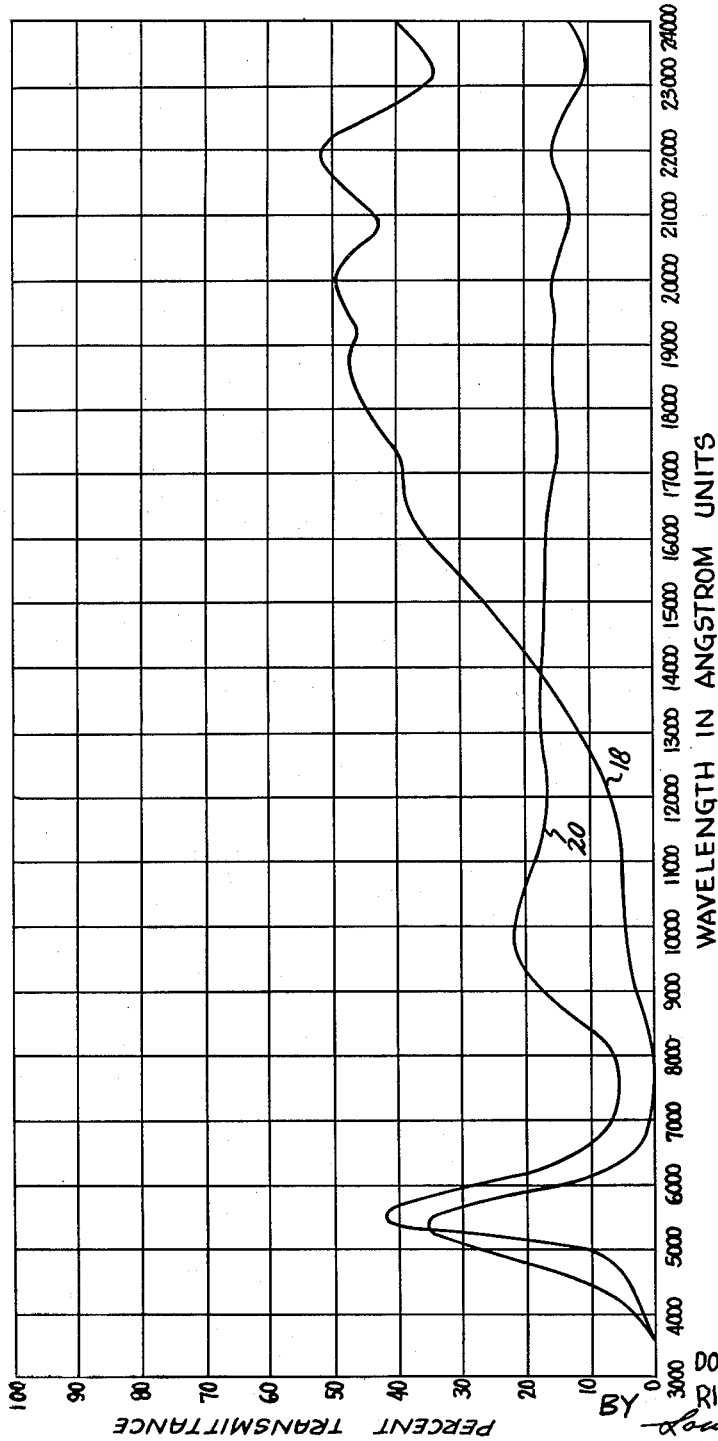

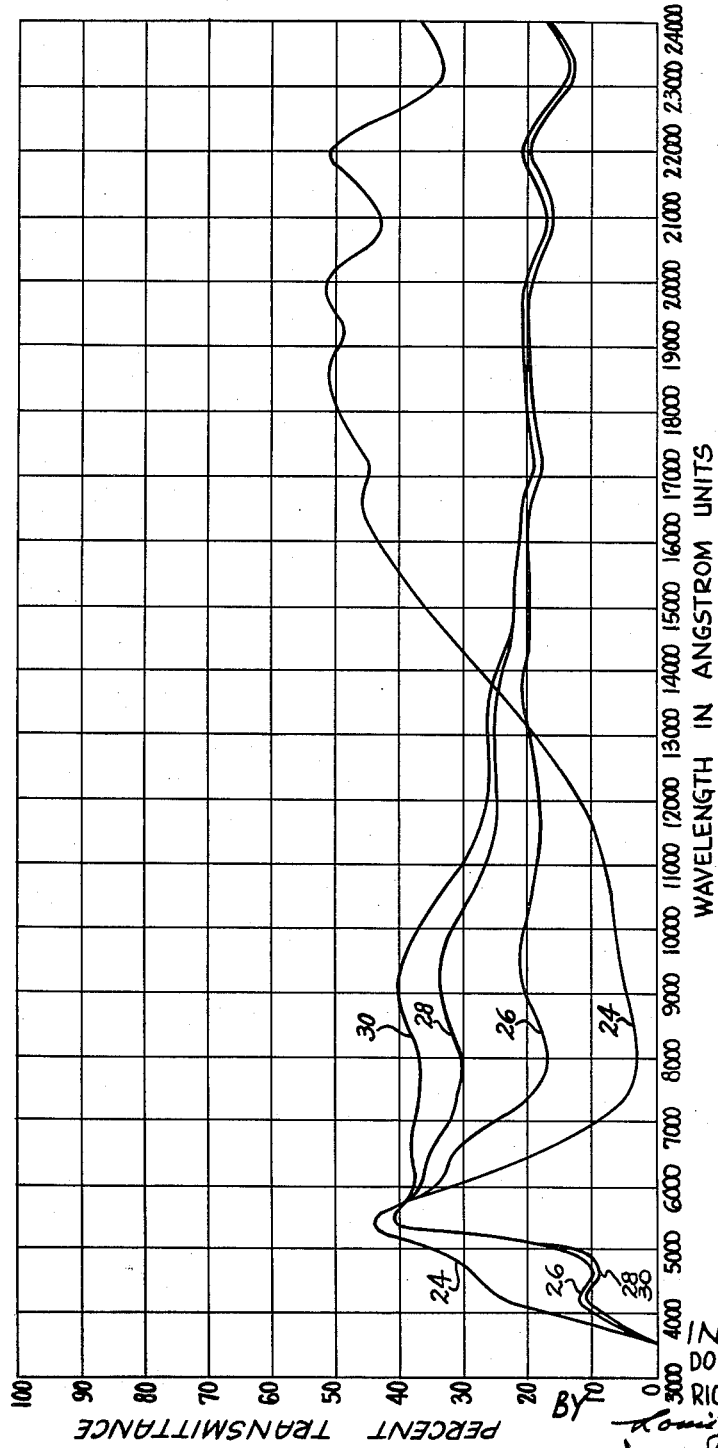

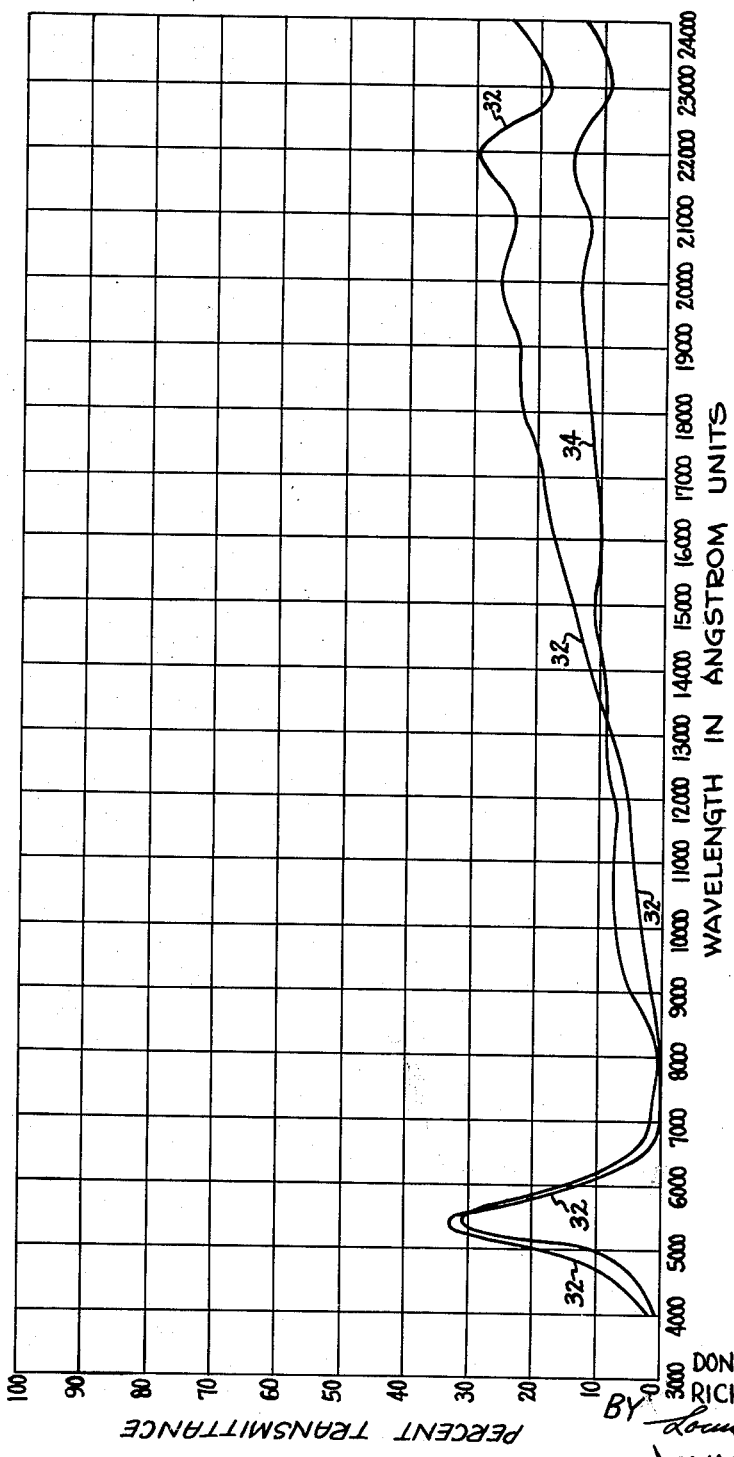

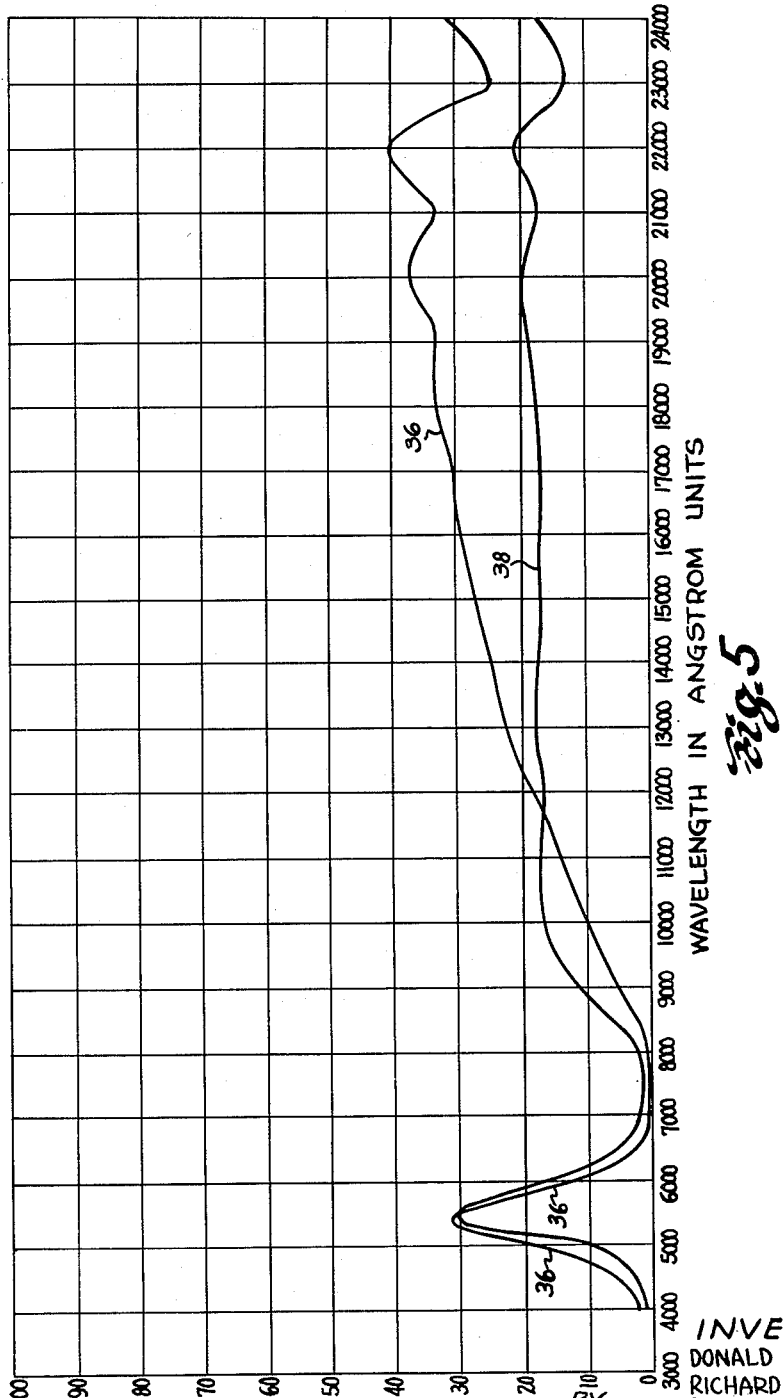

United States Patent Office 3,193,509
Patented July 6, 1965

---

3,193,509
OPTICAL FILTER AND METHOD OF MAKING SAME
Donald O. Hoffman, Sturbridge, and Richard J. Hovey, Worcester, Mass., assignors to American Optical Company, Southbridge, Mass., a voluntary association of Massachusetts
Filed Mar. 20, 1961, Ser. No. 96,864
6 Claims. (Cl. 252—300)

The field of this invention is that of light-absorptive materials, and the invention relates, more particularly, to novel and improved plastic materials having the properties of selective light absorption and transmission and to novel and improved methods for manufacturing such materials.

Light filters formed of materials of a vitreous nature are presently employed in many different situations where filters formed of plastic materials would be preferred for various reasons if such plastic filters could be adapted to display the desired transmissive and absorptive characteristics. For example, many attempts have been made to develop plastic filters for sunglasses and the like which would be adapted to effect relatively high transmission of light in the visible region of the spectrum and to effect suitably high absorption of light in the invisible regions of the spectrum. Until the present time, these attempts have been largely unsuccessful in that the filters which have been developed have not had suitably stable properties and in particular, have not retained desirable infra-red absorbing characteristics for a satisfactory period of time.

It is an object of this invention to provide novel and improved materials and novel methods for manufacturing such materials which are adapted to display selectively different absorptive properties for light of various wavelengths; to provide such plastic materials and methods for manufacturing such materials which are adapted to effect relatively high transmission of light in the visible regions of the spectrum and to effect suitably high absorption of light in the invisible regions of the spectrum; to provide such plastic materials and methods for manufacturing such materials which are adapted to effect suitably high transmission of visible light with near cut-off of at least part of the infra-red and ultra-violet portions of the spectrum; to provide such plastic materials and methods for manufacturing such materials which are highly stable and which retain desirable infra-red absorbing properties for a useful period of time; and to provide such methods which can be simply and inexpensively performed for manufacturing said materials.

Other objects and advantages of the plastic materials and methods of material manufacture provided by this invention appear in the following detailed description of preferred embodiments of the materials and methods, the detailed description referring to the drawings in which FIGURES 1–5 illustrate transmission curves for various light-transmitting filters manufactured in accordance with this invention.

According to this invention, a plastic material of a normally transparent, non-absorbing character is used to form a matrix or carrier for organic dye compounds of the polyindamine class having infra-red and ultra-violet absorbing characteristics, the dye compounds being formed in situ in dispersed relation within the plastic material to adapt the material for relatively high transmission of light of certain wavelengths in the visible region of the spectrum and for suitably high absorption of light in the infra-red and ultra-violet regions of the spectrum. As will be noted, the term "light" as used herein will be considered to include all regions of the electromagnetic spectrum including infra-red and ultra-violet radiations as well as visible light.

In the process of this invention, a normally transparent plastic material is first immersed in a solution comprised of one of a selected group of organic substances dissolved in a suitable solvent which is also adapted to permeate the plastic material, the plastic material being permitted to imbibe a controlled amount of the solution therein. This solution will hereinafter be designated as Solution A. The plastic material is then removed from Solution A and is immersed in a second solution which is hereinafter designated as Solution B, the latter solution being comprised of a selected oxidizing agent dissolved in a solvent which is also adapted to permeate the plastic material so that Solution B can be imbibed by the plastic material. For the purposes of this invention, it will generally be desirable to repeat the above-described imbibition process a selected number of times as will be more fully explained below.

It is believed that this imbibition process results in reaction between the organic substance of Solution A and the oxidizing agent of Solution B, the reaction occurring in situ within the plastic material to oxidatively polymerize the organic substance and then to effect the further step-wise oxidation of polymers of the organic substance for forming variously-oxidized, organic polyindamine dye compounds in dispersed relation within the plastic materal. In this reaction, certain of the organic dye compounds will progress through one or more low oxidized states and through a series of intermediately oxidized states to achieve what can be considered as highly oxidized forms of the organic substance, whereas oxidation of other organic dye compounds will not progress so far and will achieve only one or the other of the low or intermediately oxidized forms of the organic substance. Only the organic polyindamine dye compounds which are said to be in an intermediately oxidized state are believed to have substantial infra-red and ultra-violet absorbing properties so that, as will be understood, the ultra-violet and particularly the infra-red absorbing characteristics of the plastic material depend to a large extent upon regulation of the imbibition process and resulting reaction to establish the proper quantity of said dye compounds within the plastic material and to assure that the proper proportion of the compounds comprise intermediately oxidized forms thereof.

In this regard, it should be noted that step-wise oxidation of the organic substance is reversible and is believed to be followed by a step-wise reduction process in which the more highly oxidized forms of the organic dye compounds tend to regress to form less highly oxidized compounds and to induce further oxidation of the less highly oxidized dye compounds. Accordingly, it is an important part of this invention to control the imbibition process and the reacton resulting therefrom not only to establish a selected quantity of intermediately oxidized organic dye compounds within the plastic material but also to assure that a substantial and preferably major proportion of these dye compounds are oxidized to the maximum extent consistent with possession of suitable infra-red and ultra-violet absorbing properties, thereby to substantially extend the period of time during which said dye compounds can undergo said reduction without losing their infra-red and ultra-violet absorbing characteristics. It is also an important part of this invention to control the imbibition process so that a substantial and preferably major proportion of the remaining dye compounds formed within the plastic material comprise highly oxidized forms of the organic dye compounds so that those infra-red and ultra-violet absorbing dye compounds which ultimately lose their absorbing properties through reduction will be replaced at a suitable rate by other infra-red and ultra-violet absorbing dye compounds which are simultaneously formed by reduction of highly oxidized forms of the organic dye compounds into intermediately oxidized states, thereby to maintain or improve the infra-red and ultra-violet absorbing characteristics of the plastic material for an extended period of time. It is, of course, also desirable to use all available means for substantially retarding this reduction process for further extending the useful life of the plastic material as an infra-red and ultra-violet absorbing filter.

In regard to regulation of the described imbibition process, it should be noted that the most favorable proportion of intermediately oxidized forms of the organic dye compounds, that is the proportion of intermediately oxidized compounds which is adapted to give the plastic material its maximum ultra-violet and infra-red absorbing properties, may be first achieved during early stages of the imbibition process. However, it is believed that these intermediate oxidized dye compounds will mainly comprise compounds which have been oxidized to a relatively slight extent so that by subsequent reduction of these compounds, the plastic material would quickly lose its infra-red and ultra-violet absorbing characteristics. A plastic material embodying dye compounds in such relatively low oxidation states will thus display reduced infra-red absorbing characteristics after a slight period of aging. Therefore, it is advantageous to regulate the imbibition process in the manner specified herein to obtain intermediately oxidized or ultra-violet and infra-red absorbing organic dye compounds which are oxidized to a relatively greater extent, even though some of said dye compounds may be thereby advanced into what have been called highly oxidized or less-infra-red absorbing states so that the immediately apparent infra-red absorbing properties of the plastic material are reduced. This is particularly true in that, as will appear below, reduction of the highly oxidized organic dye compounds to form ultra-violet and infra-red absorbing compounds is believed to occur at a much more rapid rate than corresponding reduction of intermediately oxidized organic compounds to form low oxidized compounds which are less-infra-red and ultra-violet absorbing. The organic dye compounds formed within the plastic material can thus be determined to be in the desired oxidation state when slight aging of the plastic material is effective to rapidly increase the ability of the material to absorb infra-red light of at least the longer wavelengths and to adapt the plastic material for relatively high infra-red and ultra-violet absorption for an extended period of time.

The above described process can be employed for forming infra-red and ultra-violet absorbing filters from many different plastic materials where care is exercised in the selection of a suitable solvent for embodiment in Solutions A and B. The solvent as noted above, must be adapted to dissolve the selected organic substance and oxidizing agent to achieve desired concentrations thereof and also must be adapted to permeate the selected plastic material. For example, where it is desired that the plastic material comprise a film of cellulose acetate, cellulose butyrate, cellulose nitrate, ethyl cellulose, cellulose propionate, polyvinyl chloride, acetate and the like, the solvent can comprise any of the lower alkyl alcohols such as methyl, ethyl, propyl, butyl or amyl alcohols. However, where the plastic material is of a water soluble nature such as gelatin, polyvinyl alcohol, carboxymethylcellulose or hydrolyzed cellulose materials such as hydrolyzed cellulose acetate and hydrolyzed cellulose nitrate, water would be the preferred solvent. Mixtures of water and alcohol can also be used, and partially dissolving active solvents such as the aldehydes or ketones, for example acetone, can be added thereto if desired.

Organic substances which have proven useful as constituents of Solution A for imbibition into the plastic materials comprise various aniline derivatives including aniline, o-toluidine, m-toluidine, N-phenyl-p-phenylenediamine, 2,5-diethoxyaniline, and 2,5-dimethoxyaniline, each of which is adapted to be imbibed by the noted plastic materials when dissolved in a suitable solvent and which is adapted to be oxidatively polymerized and then to be further oxidized in step-wise progression for forming the above-described infra-red and ultra-violet absorbing organic polyindamine dye compounds in dispersed relation within the plastic materials.

Oxidizing agents which have been imbibed into the plastic from Solution B for forming the described organic compounds in situ within the plastic materials by reaction with aniline include dichromate salts such as potassium dichromate, sodium dichromate and ammonium dichromate as well as ferric chloride and various persulfate salts such as ammonium persulfate. Nascent oxygen generated, for example, by the gradual addition of sodium peroxide to a three (3) percent solution of hydrogen peroxide has also proven to be an effective oxidizing agent for aniline for the purposes of this invention. These oxidizing agents are also useful for forming the described compounds by reaction with the organic substances o-toluidine, m-toluidine, N-phenyl-p-phenylenediamine, 2,5-diethoxyaniline and 2,5-dimethoxyaniline. The latter organic substances may also be successfully reacted in situ for forming the organic polyindamine dye compounds within the plastic material by oxidizing agents including cupric salts such as cupric chloride, cupric ammonium chloride, cupric potassium chloride, cupric bromide, cupric sulfate, cupric nitrate and the like, ferric salts such as the noted ferric chloride, ferric nitrate, ferric oxalate and the like, ferricyanide salts such as potassium ferricyanide and the like, vanadyl salts such as vanadyl chloride, chromate salts, chlorite salts, hypochlorite salts, bromate salts, vanadate salts, iodate salts such as potassium iodate and the like, chlorate salts such as sodium chlorate and permanganate salts such as potassium permanganate.

The plastic materials treated in the process of this invention are preferably provided in the form of thin sheets or films which can be mounted upon supporting materials prior to treatment or can be sandwiched between supporting materials after treatment if desired. However, the plastic materials can also be provided in the form of relatively thick sheets or plates or can comprise cast objects such as lenses.

In forming intermediately and highly oxidized forms of the organic polyindamine dye compounds within a plastic material as described above, said compounds can be provided in greater or lesser quantities for determining the transmissive and absorptive properties of the plastic material. As the quantity of said organic dye compounds within the plastic material is increased, the plastic material will, of course, be adapted to transmit less light in both the visible and invisible regions of the spectrum. Solution A can embody various concentrations of the selected organic substance dissolved therein for forming the desired quantity of organic dye compounds within the plastic material, the plastic being immersed in Solution A for a selected period of time from approximately one-half minute to three hours so that enough of Solution A can be imbibed by the plastic for dispersing the necessary quantity of said organic substance within the plastic to form the desired quantity of said dye compounds therein. As a practical matter, a 1% concentration of the organic substance in Solution A might be the lowest concentration which would be utilized, and preferably the concentration of Solution A is relatively high, for example, at or near saturation, for substantially reducing the period of time required for said imbibition process.

The particular oxidizing agent which is dissolved in Solution B must possess sufficient oxidizing power so that, during reaction with the organic substance dispersed throughout the plastic material by Solution A, the oxidizing agent will be adapted not only to establish variously oxidized forms of the organic substance but also to advance said dye compounds to intermediately and highly oxidized states as described above. Oxidizing agents having such oxidizing power for forming organic polyindamine dye compounds of the character described from the above-noted group of organic substances are set forth above. In addition to possession of the necessary oxidizing potential, the oxidizing agent must be present in Solution B in at least sufficient quantity to assure that the desired quantity of said organic dye compounds can be formed within the plastic material and to assure that the desired proportion of said dye compounds can be well advanced into intermediately and highly oxidized states as described above. Solution B can embody various concentrations of one or more selected oxidizing agents dissolved therein for forming the desired quantity of organic dye compounds within the plastic material, the plastic being immersed in Solution B for a selected period of time from approximately one-half minute to three hours so that enough of Solution B can be imbibed to achieve the desired degree of oxidation of the organic substance dispersed in the plastic by Solution A. As a practical matter, a 1% concentration of the oxidizing agent or agents in Solution B might be the lowest concentration which would be utilized, and preferably the concentration of Solution B is relatively high, for example at or near saturation, for substantially reducing the period of time required for said imbibition process.

It should be noted that where aqueous solvents are used in the Solutions A and B, amounts of sodium chloride or other inorganic salts are preferably, but not necessarily, added to the solutions for preventing excessive swelling of the plastic materials immersed therein. It has also been found that the presence of sodium chloride in these solutions tends to slightly increase the rate of dye formation within the plastic material. For these purposes, concentrations of the sodium chloride up to twenty-five percent (25%) are effective for achieving the described beneficial results.

In order to form infra-red-absorbing polyindamine dye compounds within a plastic material in the described imbibition process, reaction between the organic substance of Solution A and the oxidizing agent of Solution B must occur in an acidic environment. However, it will be noted that Solution A embodying any one of the listed aniline derivatives will normally be a basic solution whereas Solution B embodying at least one of the listed oxidizing agents will generally be more or less acidic. According to this invention, Solutions A and B should each have a selected pH such that, when both solutions have been imbibed by a plastic material, the solutions will not tend to neutralize each other or to establish a basic environment within the plastic material. Since Solution B will normally comprise an acidic solution as noted above, an acid, preferably a mineral acid, can be added to Solution A to achieve a desirable pH for that solution. In this regard, it should be noted that formation of the desired organic dye compounds by the oxidation of aniline itself generally requires a more acidic environment than is required when other aniline derivatives are used. Therefore, where Solution A embodies aniline as a dye former, sufficient acid is preferably added to the solution for achieving a pH between 0 and 3.5 in the solution. Where other aniline derivatives are embodied in Solution A, acid can be added to the solution for achieving a pH factor between 0 and 6.5 although formation of the desired organic dye compounds will generally occur more rapidly where Solution A has a relatively low pH. Where Solution A embodies an aqueous solvent, the addition of a mineral acid such as sulfuric, hydrochloric, or nitric acid to the solution is of further advantage in substantially increasing the concentration of the selected aniline derivative which can be obtained in the solution.

The process described herein can be conveniently performed with the required solutions and plastic material at room temperature. However, the process can also be successfully completed at temperatures as low as 55° Fahrenheit and can be more rapidly completed at increased temperatures as high as 120° Fahrenheit, the upper temperature limit being imposed to avoid excessive swelling of the plastic material.

Although the organic substances and oxidizing agents dissolved in Solutions A and B respectively can be used in many different combinations and concentrations to be imbibed into various plastic materials for different periods of time and in different sequences to provide plastic materials having selected transmissive and absorptive characteristics, a preferred arrangement for performing the process of this invention is set forth as follows.

Three solution designated as Solutions A, B and $B_1$ are prepared in suitable receptacles, Solution $B_1$ comprising a solution which is less concentrated but otherwise similar to Solution B for a purpose which will be described below. Solution A is comprised of 0.042 mole of 2,5-dimethoxyaniline dissolved in 1000 cc. of water, 0.750 mole of sodium chloride and 0.100 mole of hydrochloric acid being added to the solution for purposes explained above. Solution B is comprised of 0.175 mole of ferric chloride dissolved in 1000 cc. of water, 0.720 mole of sodium chloride being added to this solution. Solution $B_1$ is comprised of 0.00875 mole of ferric chloride and 0.036 mole of sodium chloride dissolved in 1000 cc. of water.

A plastic material is provided comprising a cellulose acetate butyrate supporting film of approximately 0.010 inch thickness which is subcoated on each side with polyvinyl alcohol and which is permanently or temporarily laminated on each side with a polyvinyl alcohol film of about 0.003 inch thickness in a well known manner. With the plastic material and solutions at room temperature, the plastic material is immersed in Solution A for a period of three minutes, then in Solution B for two minutes, then in Solution A for six minutes, then in Solution B for one-half minute, then in Solution A for three minutes and finally in Solution $B_1$ for a period of six minutes. Preferably, the plastic material is rinsed in distilled water, for example, or is otherwise treated between immersions in the solutions in order to remove excess solution from the surfaces of the plastic material.

The above-described sequence in the imbibition process can be considered to include three repeated sequence steps. In the first step which comprises an immersion of the plastic material in each of Solutions A and B, a small amount of organic polyindamine dye is formed within the polyvinyl alcohol material by the reaction previously explained. This short, preliminary process step is not absolutely necessary for preparing the improved light filtering material provided by this invention, but it has been found that the initial formation of a small amount of organic dye within the plastic material is adapted to increase the rate at which the plastic material will subsequently absorb more of the reactants from Solutions A and B, thereby reducing the overall time required for completing the process. In the second sequence step comprising another immersion of the plastic material in each of Solutions A and B, a substantial amount of the organic substance carried by Solution A can be rapidly dispersed within the plastic. Then, as the rate of absorption of organic material from Solution A will tend to gradually decrease, the organic substance thus far absorbed by the plastic can be oxidized by the immersion in Solution B to prepare the material for subsequent rapid absorption of a further amount of the organic substance. In the third sequence step comprising an immersion of the plastic material in each of Solutions A and $B_1$, the desired quantity of the organic substance carried in Solution A is finally established in dispersed relation through the plastic material. By the immersion in Solution $B_1$, the organic substance is oxidized to achieve the desired proportions of intermediately and highly oxidized forms of the organic substance as above described. The use of a relatively lower concentration of the oxidizing agent in Solution $B_1$ slightly extends the process time required for achieving said final oxidation but permits greater control over the final oxidizing period so that the desired transmissive and absorptive properties for the plastic material can be accurately obtained.

It will be noted that one immersion in each of Solution A and Solution B are required for the purpose of this invention but that repeated, shorter immersions in the described solutions or in similar solutions will generally be preferred for control purposes. However, it must be noted that immersion of the plastic material in Solution A tends to reduce the oxidation state of the organic dye compounds thus far formed within the plastic material whereas immersion of the material in Solution B, where Solution B embodies a sufficient quantity of an oxidizing agent of adequate oxidizing potential, tends to cause further oxidation of said dye compounds. Thus the immersion sequence utilized must be regulated so that following the final immersion step, the plastic material will have the desired proportion of intermediately and highly oxidized organic dye compounds therein as previously described. This result is best achieved by arranging the immersion procedure so that the final immersion step is carried out in that solution embodying the selected oxidizing agent.

During the above-described imbibition process, the plastic material, which was originally clear, will acquire a green color and will acquire absorptive characteristics as illustrated by the curve 10 in FIG. 1. That is, the plastic material will be adapted for approximately forty-four percent (44%) transmission of visible light of 5300 Angstrom units wavelength, will be adapted for substantially complete cut-off of ultra-violet light below 3600 Angstrom units wavelength, will be adapted for less than ten percent (10%) transmission of infra-red and near infra-red light between 7000 Angstrom units wavelength and 11,500 Angstrom units wavelength, and will have peak transmittance of approximately fifty-five percent (55%) for infra-red light of 18,500 Angstrom units wavelength. It is believed that the plastic material then has variously oxidized organic dye compounds dispersed throughout the material including substantial proportions of intermediately oxidized and highly oxidized forms of the compounds, the infra-red and ultra-violet absorbing characteristics of the plastic material, of course, being attributable to the intermediately oxidized forms of the compounds as noted previously.

After a period of aging in daylight, or in artificial daylight provided by a suitable source which is rich in ultra-violet light, for example following an exposure of the plastic material to ultra-violet light in an Atlas Fadeometer, Type FDA–R, for a period of twenty (20) hours which is roughly equivalent to aging in daylight for a period of two (2) months, the transmissive and absorptive properties of the plastic material will be altered as illustrated by the curve 12 in FIG. 1 due to what is believed to be reduction of organic compound dispersed through the plastic material. In this regard, it should be noted that reduction of the highly oxidized forms of said organic compounds to form intermediately oxidized forms of the compounds is believed to occur more readily than corresponding reduction of the intermediately oxidized compounds to form low oxidized forms of the compounds. Thus, following an initial period of aging as above described, the plastic material will have absorptive characteristics as shown in curve 12 wherein transmittance of approximately sixty-five percent (65%) will now occur for visible light of longer wavelength of about 7500 Angstrom units wavelength, cutoff of ultra-violet light of wavelengths below 3600 Angstrom units will remain substantially complete, infra-red and near infra-red transmission for light of wavelength between 7500 and 11,500 Angstrom units will increase to approximately sixty-five percent (65%) and, most important, infra-red transmission for light above 15,000 Angstrom units wavelength will fall below forty percent (40%). During subsequent aging of the plastic material, for example, for periods of forty (40) and sixty (60) hours in the Fadeometer as indicated by curves 14 and 16 respectively in FIG. 1, additional change in the absorptive properties of the plastic material will occur more slowly, transmission of visible light remaining relatively high while substantially all ultra-violet light is absorbed and while infra-red transmission is maintained at suitably low levels to permit use of the plastic material as a sunglass lens. Control of the imbibition process above-described to disperse desired proportions of intermediately and highly oxidized forms of said organic compounds through the plastic thus provides infra-red and ultra-violet absorbing plastic material which will maintain desirable transmissive and absorptive characteristics for at least as long as sunglass lenses, for example, are likely to remain in use.

The plastic material provided by this invention can be further improved by dispersal of Naphthol Green B dye within the plastic material, this dye being adapted for absorbing infra-red and near infra-red light of relatively short wavelengths. For this purpose, a Naphthol Green B solution herein designated Solution C, can be prepared, and the plastic material, previously treated in Solutions A and B in the manner previously described, can be immersed in Solution C to permit absorption of the Naphthol Green B. For the purposes of this invention, an aqueous or alcohol solution of the Naphthol Green B of concentration up to saturation, or approximately two percent (2%) concentration, can be utilized. For absorbing a useful amount of Naphthol Green B, the plastic material can be immersed in Solution C for a period up to five minutes. Immersion of the plastic material in Solution C should be performed at temperatures within the range prescribed for immersion of the plastic in Solutions A and B for the purposes previously described. It should be noted that addition of the Naphthol Green B to the plastic material is not only adapted to absorb the noted band of infra-red and near infra-red light, but is also adapted to retard reduction of the organic dye polyindamine compounds formed within the plastic material.

For example, a Solution C can be prepared embodying 0.02 moles of Naphthol Green B in 1000 cc. of water. The supported polyvinyl alcohol film previously described can then be treated in Solutions A, B and $B_1$ in the manner described with reference to FIG. 1 and can then be immersed in the prepared Solution C for a period of three minutes. This plastic material will then have a green color which is not noticeably different from the color of the material described with reference to FIG. 1. However, as shown by the curves in FIG. 2, this material will have absorptive characteristics which are substantially improved and which are also substantially more stable. Thus, as shown by curve 18 in FIG. 2, this plastic material, prior to aging, will be adapted for about thirty-five percent (35%) transmission of visible light of 5300 Angstrom units wavelengths, for substantially complete cutoff of ultra-violet light of wavelengths shorter than 3600 Angstrom units, for less than ten percent (10%) transmission of infra-red and rear infra-red light of wavelengths between 6200 and 12,700 Angstrom units, and for peak transmittance of approximately fifty percent (50%) for infra-red light of 22,000 Angstrom units wavelength. Further, after aging of this plastic material for twenty (20) hours in the described Fadeometer, the material will be adapted for substantially improved infra-red absorption properties as shown by the curve 20 in FIG. 2. As illustrated, peak visible transmission for the aged plastic will be at approximately forty-two percent (42%) for slightly longer wavelengths of 5500 Angstrom units, and cutoff of ultra-violet light will remain substantially complete. In addition, there will be some increase in transmission of infra-red light in the range of light of 10,000 Angstrom units wavelength and even more substantial decrease in transmission of infra-red light in the range above 14,000 Angstrom units wavelength so that transmission of infra-red and near infra-red light above 6200 Angstrom units wavelength will generally not exceed twenty-two percent (22%).

Additional aging of this plastic material for twenty (20) hours in the described Fadeometer does not substantially alter the transmission characteristics of the material (not illustrated) thus indicating that the addition of Naphthol Green B tends to retard reduction of the polyindamine dye compounds dispersed therein.

Another stabilized infra-red absorbing filter can be provided by shielding a plastic material, which has been treated in the manner described with reference to FIG. 1 for example, with a conventional ultra-violet absorbing film. In this regard, it should be noted that ultra-violet light tends to accelerate reduction of the oxidized organic compounds which have been dispersed throughout the plastic material by the process of this invention. Thus, shielding of the plastic material with the ultra-violet absorbing material retards said reduction and provides a filter having substantially more stable absorptive characteristics.

For example, when a polyvinyl alcohol film of the character above described is treated in the manner described with reference to FIG. 1 and is thereafter shielded upon each side with an ultra-violet absorbing film such as the cellulose acetate film which is commercially available under the trade name Cyasorb for example, there will be provided a filter having the characteristics indicated in FIG. 3. In this example, shielding films 0.010 inch in thickness which are adapted for approximately one hundred percent (100%) absorption of ultra-violet light were used. As shown in FIG. 3, by the curve 24, the shielded filter prior to aging has characteristics which are the same as those of the filter described with reference to FIG. 1 prior to aging of that filter. Compare curve 24 with the curve 10 in FIG. 1. After aging of this filter for twenty (20) hours, forty (40) hours, and sixty (60) hours in the above-described Fadeometer, the transmission characteristics of the shielded filter will be as indicated by curves 26, 28 and 30 respectively in FIG. 3. It will be noted that the initial aging and subsequent aging periods result in changes in absorptive characteristics which are similar to those which resulted from such aging of the material described with reference to FIG. 1. However, since the changes in absorptive characteristics will be less pronounced following identical periods of aging, as can be seen by comparison of the curves of FIG. 3 with the curves of FIG. 1, it can be readily undersood that use of the shielded ultra-violet absorbing film is adapted to provide a filter having more stable absorptive and transmissive characteristics.

Where the plastic filter of this invention incorporates both organic dye compounds of the polyindamine class and Napthol Green B dye and is also shielded with ulta-violet absorbing film, the plastic is adapted to display highly desirable absorptive and transmissive properties. For example, where a plastic material is prepared in the manner described with reference to FIG. 2 and is then laminated with the ultra-violet absorbing film described with reference to FIG. 3, the plastic material will have absorptive and transmissive characteristics as illustrated by the curve 32 in FIG. 4. As shown, such a plastic material is adapted for thirty-three percent (33%) transmission of visible light of 5400 Angstrom units wavelength, for substantially complete cutoff of ultra-violet light of wavelengths shorter than 3600 Angstrom units, for less than ten percent (10%) transmission of light of wavelengths between 6200 and 13,500 Angstrom units, and for peak transmission of approximately thirty percent (30%) for infra-red light of 22,000 Angstrom units wavelength. After aging of this material for a period of twenty (20) hours in the above-described Fadeometer, the transmissive properties of the material will be substantially unchanged for light of wavelengths shorter than 13,500 Angstrom units, as indicated by the curve 34 in FIG. 4. However, transmission of light of wavelengths longer than 13,500 Angstrom units will be substantially decreased and will not exceed fifteen percent (15%). After further aging of this material up to sixty (60) hours, the transmissive properties of the material (not illustrated) will remain substantially unchanged with very slowly improving infra-red absorbing characteristics.

It will be noted that the specific plastic filters thus far described as examples have incorporated polyindamine dye compounds which are the reaction products of 2,5-dimethoxyaniline and a ferric chloride oxidizing agent in polyvinyl alcohol. Where polyindamine dye compounds which are the reaction products of others of the listed organic substances and oxidizing agents are established within other described plastic materials in the same processes as are described with reference to FIGS. 1–4, the specific absorptive and transmissive properties of the plastic material will differ but will display closely related characteristics. For example where a supported polyvinyl alcohol film is treated in a manner similar to that described with reference to FIG. 4 except that the Solution A utilized in such treatment is altered by substituting 0.042 mole of 2,5-diethoxyaniline for the 2,5-dimethoxyaniline previously described, the plastic material will display transmissive properties as illustrated in FIG. 5. Prior to aging, this material will have the transmissive properties indicated by curve 36, generally corresponding to the material described with reference to FIG. 4 but with slightly higher transmission in the infra-red. Compare curves 36 and curve 32. After twenty (20) hours of aging in the described Fadeometer, the transmission of the material will be improved as indicated by curve 38 but will still be adapted for slightly higher infra-red transmission than the material described with reference to FIG. 4. Compare curve 38 to curve 34. Thus the characteristics of the filter materials prepared in these processes are slightly different but disclose a definite relationship.

If desired, after preparation of plastic filter materials in the manner described, the materials can be treated in any well known manner for hardening the materials or for rendering them solvent resistant. For example, polyvinyl alcohol filters prepared according to this invention can be cross-linked with a boric acid solution in conventional manner. That is, an aqueous boric acid solution of concentration between two percent (2%) and five percent (5%) can be prepared and the plastic polyvinyl alcohol material treated as above described can be immersed in the boric acid solution for at least one (1) minute, and longer if desired, at room temperature. This will effect cross-linking of the polyvinyl alcohol at least at the surface of the filter and will provide a film which is significantly less water-permeable.

Although particular embodiments of the materials and methods of this invention have been described for the purposes of illustration, it should be understood that this invention includes all modifications and equivalents thereof which fall within the scope of the appended claims.

Having described our invention, we claim:

1. A transparent plastic material having dispersed therein oxidatively polymerized compounds of an organic substance selected from the group consisting of aniline, 2,5-diethoxyaniline, 2,5-dimethoxyaniline, o-toluidine, m-toluidine, and N-phenyl-p-phenylenediamine, a selected proportion of said compounds comprising intermediately oxidized, infra-red-absorbing forms of said selected organic substance and a selected proportion of the others of said compounds comprising highly oxidized forms of said selected substance, said proportion of said highly oxidized forms of said substance being such that said plastic material is adapted to increase its ability to absorb infra-red light of at least selected wavelengths after a relatively short period of aging.

2. A transparent plastic material having dispersed therein organic compounds which are the reaction products of an organic substance selected from the group consisting of aniline, 2,5-diethoxyaniline, 2,5-dimethoxyaniline, o-toluidine, m-toluidine and N-phenyl-p-phenylenediamine and an oxidizing agent selected from the group consisting of dichromate salts, persulfate salts, ferric chloride and nascent oxygen, a selected proportion of said compounds comprising intermediately oxidized, infra-red absorbing forms of said selected organic substance and a selected proportion of the others of said compounds comprising highly oxidized forms of said selected organic substance, said proportion of said highly oxidized forms of said substance being such that said plastic material is adapted to increase its ability to absorb infra-red light of at least selected wavelengths after a relatively short period of aging.

3. A transparent plastic material having dispersed therein oxidatively polymerized compounds of an organic substance selected from the group consisting of aniline, 2,5-diethoxyaniline, 2,5-dimethoxyaniline, o-toluidine, m-toluidine and N-phenyl-p-phenylenediamine, a substantial proportion of said compounds comprising intermediately oxidized, infra-red absorbing forms of said selected organic substance and a substantial proportion of the others of said compounds comprising highly oxidized forms of said sheleted substance, said proportion of said highly oxidized forms of said substance being such that the said plastic material is adapted to increase its ability to absorb infra-red light of at least selected wavelengths after a relatively short period of aging, said plastic material having Naphthol Green B dye dispersed therein.

4. A transparent plastic material having dispersed therein organic compounds which are the products of an organic substance selected from the group consisting of aniline, 2,5-diethoxyaniline, 2,5-dimethoxyaniline, o-toluidine, m-toluidine and N-phenyl-p-phenylenediamine reacted in situ within the plastic material in the presence of a mineral acid with an oxidizing agent selected from the group consisting of dichromate salts, persulfate salts, ferric chloride and nascent oxygen, a substantial proportion of said compounds comprising intermediately oxidized, infra-red-absorbing forms of said selected oragnic substance and a substantial proportion of the others of said compounds comprising highly oxidized forms of said selected organic substance, said proportion of said highly oxidized forms of said substance being such that said plastic material is adapted to increase its ability to absorb infra-red light of at least selected wavelengths after a relatively short period of aging, said plastic material having Naphthol Green B dye dispersed therein.

5. A transparent plastic material shielded by film which is adapted to absorb ultra-violet light, said material having dispersed therein organic compounds which are the products of an organic substance selected from the group consisting of aniline, 2,5-diethoxyaniline, 2,5-dimethoxyaniline, o-toluidine, m-toluidine, and N-phenyl-p-phenylenediamine reacted in situ within the plastic material in the presence of a mineral acid and sodium chloride with an oxidizing agent selected from the group consisting of dichromate salts, persulfate salts, ferric chloride and nascent oxygen, a substantial proportion of said compounds comprising intermediately oxidized forms of said selected organic substance and a substantial proportion of the others of said compounds comprising highly oxidized forms of said selected organic substance, said proportion of said highly oxidized forms of said substance being such that said plastic material is adapted to increase its ability to absorb infra-red light of at least selected wavelengths after a relatively short period of aging, said plastic material having Nahpthol Green B dye dispersed therein.

6. A method for forming a plastic filter material comprising the steps of providing a transparent plastic material; preparing a first solution comprising an organic substance selected from the group consisting of aniline, 2,5-diethoxyaniline, 2,5-dimethoxyaniline, o-toluidine, m-toluidine and N-phenyl-p-phenylenediamine in a solvent adapted to permeate said plastic material; preparing an additional solution comprising Naphthol Green B dye in a solvent adapted to permeate said plastic material; imbibing said first solution into said plastic material for establishing said selected organic substance in dispersed relation therein; oxidatively polymerizing said selected organic substance in situ within the plastic material for forming compounds of said selected substance and for elevating a substantial proportion of said compounds to an intermediately oxidized infra-red absorbing state and a substantial proportion of the others of said compounds to a highly oxidized state, said proportion of said compounds which are elevated to said high oxidized state being such that the plastic material is adapted for relatively high transmission of visible light and relatively high absorption of infra-red light and is adapted to increase its infra-red absorbing ability after a relatively short period of aging; and imbibing said adidtional solution within the plastic material for establishing said Naphthol Green B dye in dispersed relation therein.

References Cited by the Examiner
UNITED STATES PATENTS 2,895,955 7/59 Heseltine et al. _____ 252—300
2,971,921 2/61 Coleman et al. _____ 252—300

JULIUS GREENWALD, *Primary Examiner.*

JOSEPH R. LIBERMAN, *Examiner.*